US011180122B2

(12) United States Patent
Sato

(10) Patent No.: US 11,180,122 B2
(45) Date of Patent: Nov. 23, 2021

(54) SAFETY DEVICE OF WORKING VEHICLE

(71) Applicant: KABUSHIKI KAISHA AICHI CORPORATION, Saitama (JP)

(72) Inventor: Mitsuru Sato, Ageo (JP)

(73) Assignee: KABUSHIKI KAISHA AICHI CORPORATION, Saitama (JP)

( * ) Notice: Subject to any disclaimer, the term of this patent is extended or adjusted under 35 U.S.C. 154(b) by 58 days.

(21) Appl. No.: 16/796,605

(22) Filed: Feb. 20, 2020

(65) Prior Publication Data
US 2021/0261102 A1 Aug. 26, 2021

(51) Int. Cl.
B60T 7/12 (2006.01)
B60W 10/184 (2012.01)
B60W 10/20 (2006.01)
B62D 6/00 (2006.01)
B66F 11/04 (2006.01)

(52) U.S. Cl.
CPC .............. B60T 7/12 (2013.01); B60W 10/184 (2013.01); B60W 10/20 (2013.01); B62D 6/001 (2013.01); B60T 2230/02 (2013.01); B60W 2520/04 (2013.01); B60W 2520/14 (2013.01); B60W 2520/16 (2013.01); B60W 2520/18 (2013.01); B66F 11/04 (2013.01)

(58) Field of Classification Search
CPC .... B60T 7/12; B60T 2230/02; B60W 10/184; B60W 10/20; B62D 6/001
See application file for complete search history.

(56) References Cited

U.S. PATENT DOCUMENTS 4,768,399 A * 9/1988 Kubo ................... B60K 17/346
180/249
6,523,632 B1 * 2/2003 Hanaoka ............... B62D 7/1509
180/236
2006/0124374 A1 * 6/2006 Katada ............... B60K 23/0808
180/233
2009/0221392 A1 * 9/2009 Bruce ................ B60K 23/0808
475/205
2010/0301825 A1 * 12/2010 Yamaguchi ......... H02M 3/1588
323/284
2012/0111691 A1 * 5/2012 Leiter ..................... B60T 10/02
192/221
2013/0245909 A1 * 9/2013 Hirose .................. B60T 8/1764
701/73
2014/0213412 A1 * 7/2014 Marsh ................... B60W 10/20
477/35
2020/0102004 A1 * 4/2020 Yamazaki ............... B60T 8/172

FOREIGN PATENT DOCUMENTS

JP 3976997 B2 9/2007
JP 2020-006905 A 1/2020

* cited by examiner

Primary Examiner — Hussein Elchanti
(74) Attorney, Agent, or Firm — Studebaker & Brackett PC

(57) ABSTRACT

The safety device comprises a vehicle body inclination angle detector to detect an inclination angle of the vehicle body. In a vehicle body attitude in which the inclination angle of the vehicle body detected by the vehicle body inclination angle detector is less than a predetermined inclination angle, while any travel operation by the travel operation device is not performed, when a steering operation by the steering operation device is performed, the travel controller performs control to release braking the front wheels and the rear wheels by the brake device and to make the steering device turn the front wheels and the rear wheels in accordance with the steering operation.

5 Claims, 4 Drawing Sheets

SAFETY DEVICE OF WORKING VEHICLE

TECHNICAL FIELD

The present invention relates to a safety device of a working vehicle which travels while front wheels and rear wheels are turned to change the travel direction.

TECHNICAL BACKGROUND

As example working vehicles, there are known a so-called self-propelled mobile elevating work platform comprising, on the vehicle body, a boom-type or scissors-link-type elevating machine and a platform supported moving up and down by the elevating machine, a self-propelled excavating vehicle comprising an excavating device on the vehicle body, and the like which are widely used in construction work, shipbuilding work, and so on. These working vehicles are configured such that, when the vehicles are stopped, a brake is automatically applied restricting the rotation of the wheels so that work at height or so on can be safely performed. And they are configured such that, when travel operation is performed, the brake is released and that the wheels are driven to rotate so that the vehicle can travel according to the travel operation.

Among working vehicles as described above, there are a two-wheel-steering working vehicle with which to turn either of the front wheels and rear wheels provided in the front and rear, and right and left of the vehicle body to change the travel direction (see, e.g., Japanese Patent Publication No. 3976997(B2)), and a four-wheel-steering working vehicle with which to turn both of the front wheels and rear wheels to change the travel direction. With these working vehicles, while the vehicle is stopped without performing travel operation, when only steering operation is performed (at the time of so-called "stationary steering"), if wheels whose rotation is restricted are forcedly turned, with the hard road surface, the tire wheels may wear away more quickly, or stepped operation may occur. Hence, conventionally, working vehicles are configured such that, when only steering operation is performed alone, with keeping the brake on the non-steered wheel side at work, the brake on the steered wheel side is released so that turning action is performed according to the steering operation.

Problems to be Solved by the Invention

However, releasing the brake on the steered wheel side leads to brake force being decreasing accordingly, and in a four-wheel-steering working vehicle as above, brake force to keep the vehicle stopped is reduced to nearly zero. Thus, there is the problem that if only steering operation is performed alone while a working vehicle is stopped on sloping land, the vehicle may travel down the slope with wheels rolling.

SUMMARY OF THE INVENTION

In view of this problem, an object of the present invention is to provide a safety device of a working vehicle with which can stop even a four-wheel-steering working vehicle from traveling down the slope with wheels rolling and prevent the wearing away of wheels and stepped operation associated with stationary steering.

Means to Solve the Problems

In order to solve the above problem, the present invention is a safety device of a working vehicle comprising front wheels and rear wheels rotatably provided on the front and rear, and right and left of a vehicle body respectively; a steering device (e.g., a steering device 90 in embodiments) to make each of the front wheels and the rear wheels turn to change a travel direction of the vehicle; a drive device (e.g., front-wheel traveling motors 16, rear-wheel traveling motors 17 in embodiments) to rotationally drive at least either of the front wheels and the rear wheels to make the vehicle travel; brake devices (e.g., front-wheel brake cylinders 18, rear-wheel brake cylinders 19 in embodiments) to brake the rotation of each of the front wheels and the rear wheels; a steering operation device (e.g., a steering dial 72 in embodiments) being operated by an operator to steer the front wheels and the rear wheels; a travel operation device (e.g., a travel operating lever 71 in embodiments) being operated by an operator to make the vehicle travel by the drive device; and a travel controller to control working of the steering device based on a steering operation of the steering operation device and to control working of the drive device and the brake device based on a travel operation of the travel operation device, wherein when any travel operation by the travel operation device is not performed, the travel controller performs braking the front wheels and the rear wheels by the brake device, and wherein when a travel operation by the travel operation device is performed, the travel controller releases the braking by the brake device and makes the drive device work the vehicle to travel based on the travel operation. Further, the safety device comprises a vehicle body inclination angle detector to detect an inclination angle of the vehicle body. In a vehicle body attitude in which the inclination angle of the vehicle body detected by the vehicle body inclination angle detector is less than a predetermined inclination angle, while any travel operation by the travel operation device is not performed, when a steering operation by the steering operation device is performed, the travel controller performs control to release braking the front wheels and the rear wheels by the brake device and to make the steering device turn the front wheels and the rear wheels in accordance with the steering operation.

The safety device of the working vehicle having the above configuration is preferably configured such that, in a vehicle body attitude in which the inclination angle of the vehicle body is greater than or equal to the predetermined inclination angle, while any travel operation by the travel operation device is not performed, when a steering operation by the steering operation device is performed, the travel controller keeps braking the front wheels and the rear wheels by the brake device and restricts steering by the steering device so as not to turn both the front wheels and the rear wheels, and that while the restriction is being performed, when a travel operation by the travel operation device is performed, the travel controller performs control to release braking the front wheels and the rear wheels by the brake device and to make the steering device turn the front wheels and the rear wheels in accordance with the steering operation and to make the drive device work the vehicle to travel in accordance with the travel operation.

The safety device of the working vehicle having the above configuration is preferably configured such that, in a vehicle body attitude in which the inclination angle of the vehicle body is greater than or equal to the predetermined inclination angle, while any travel operation by the travel operation device is not performed, when a steering operation by the steering operation device is performed, the travel controller performs control to release braking either wheels of the front wheels and the rear wheels by the brake device and to make the steering device turn the either wheels and thereafter to release braking the other wheels of the front wheels and the rear wheels by the brake device and to make the steering device turn the other wheels.

The safety device of the working vehicle having the above configuration is preferably configured such that, the steering device is configured to be switchable between a four-wheel turning state where both the front wheels and the rear wheels are turned and a two-wheel turning state where only either wheels of the front wheels and the rear wheels are turned, and that in a vehicle body attitude in which the inclination angle of the vehicle body is greater than or equal to the predetermined inclination angle, while travel operation by the travel operation device is not performed, when steering operation by the steering operation device is performed, the travel controller performs control to switch the steering device to the two-wheel turning state and to release braking the either wheels by the brake device and to make the steering device turn the either wheels.

The safety device of the working vehicle having the above configuration preferably comprises a wheel load detecting device to detect a load imposed on each of the front wheels and the rear wheels and is preferably configured such that, in a vehicle body attitude in which the inclination angle of the vehicle body is greater than or equal to the predetermined inclination angle, while any travel operation by the travel operation device is not performed, when a steering operation by the steering operation device is performed, the travel controller performs control to release braking by the brake device for only the wheels whose loads detected by the wheel load detecting device are smaller from among the front wheels and the rear wheels and to make the steering device turn only the wheels.

Advantageous Effects of the Invention

The safety device of the present invention is configured, in a vehicle body attitude in which the inclination angle of the vehicle body is less than a predetermined inclination angle, while any travel operation is not performed, when a steering operation is performed (stationary steering), to perform control to release braking the front wheels and the rear wheels and to turn the front wheels and the rear wheels in accordance with the steering operation. Therefore, on flat land of less than the predetermined inclination angle, with brakes on four wheels of the front wheels and the rear wheels being released, the turning of the four wheels is allowed, so that none of the stepped or jerky operation of steering, an abrupt change in the steering angle at the time of releasing brakes, and so on by accumulating the rebound resilience of tire wheels occurs, and also tires wearing can be suppressed. Further, because of flat land of less than the predetermined inclination angle, even if brakes on the four wheels are released, there is no danger of runaway such as the vehicle traveling down the slope with wheels rolling.

The safety device having the above configuration is preferably configured such that, in a vehicle body attitude in which the inclination angle of the vehicle body is greater than or equal to the predetermined inclination angle, when stationary steering is performed, control is performed to keep braking the front wheels and the rear wheels and to restrict not to turn the front wheels nor the rear wheels, and that while the restriction is being performed, when travel operation is performed, control is performed to release braking the front wheels and the rear wheels and to turn the front wheels and the rear wheels in accordance with the steering operation and to make the drive device work the vehicle to travel in accordance with the travel operation.

With this configuration, on sloping land of greater than or equal to the predetermined inclination angle, all brake force acting on four wheels of the front wheels and the rear wheels is kept, so that the vehicle traveling down the slope with wheels rolling can be reliably prevented.

The safety device having the above configuration is preferably configured such that, in a vehicle body attitude in which the inclination angle of the vehicle body is greater than or equal to the predetermined inclination angle, when a stationary steering is performed, a control is performed to release braking either wheels of the front wheels and the rear wheels and to turn the either wheels and thereafter to release braking the other wheels of the front wheels and the rear wheels and to turn the other wheels. With this configuration, on sloping land of greater than or equal to the predetermined inclination angle, brake force acting on two wheels of the front wheels or the rear wheels is kept, so that the vehicle traveling down the slope with wheels rolling can be prevented and that the stepped operation of steering and tires wearing can also be suppressed.

The safety device having the above configuration is preferably configured such that, in a vehicle body attitude in which the inclination angle of the vehicle body is greater than or equal to the predetermined inclination angle, when a stationary steering is performed, a control is performed to switch to the two-wheel turning state where only either wheels of the front wheels and the rear wheels are turned and to release braking the either two wheels and to turn them. With this configuration, on sloping land of greater than or equal to the predetermined inclination angle, brake force acting on two wheels not turned (non-steered wheels) is kept, so that the vehicle traveling down the slope with wheels rolling can be prevented and that the stepped or jerky operation of steering and tires wearing can also be suppressed.

The safety device having the above configuration is preferably configured such that, in a vehicle body attitude in which the inclination angle of the vehicle body is greater than or equal to the predetermined inclination angle, when a stationary steering is performed, a control is performed to release braking for only the wheels whose loads detected by the wheel load detecting device are smaller from among the front wheels and the rear wheels and to turn only the wheels. With this configuration, on sloping land of greater than or equal to the predetermined inclination angle, brake force acting on two wheels whose loads are larger is kept, so that the vehicle traveling down the slope with wheels rolling can be prevented and that the stepped or jerky operation of steering and tires wearing can also be suppressed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTIONS OF THE DRAWINGS

The present invention will become more fully understood from the detailed description given herein below and the accompanying drawings which are given by way of illustration only and thus are not limitative of the present invention.

DESCRIPTION OF THE EMBODIMENTS

Figure 1:
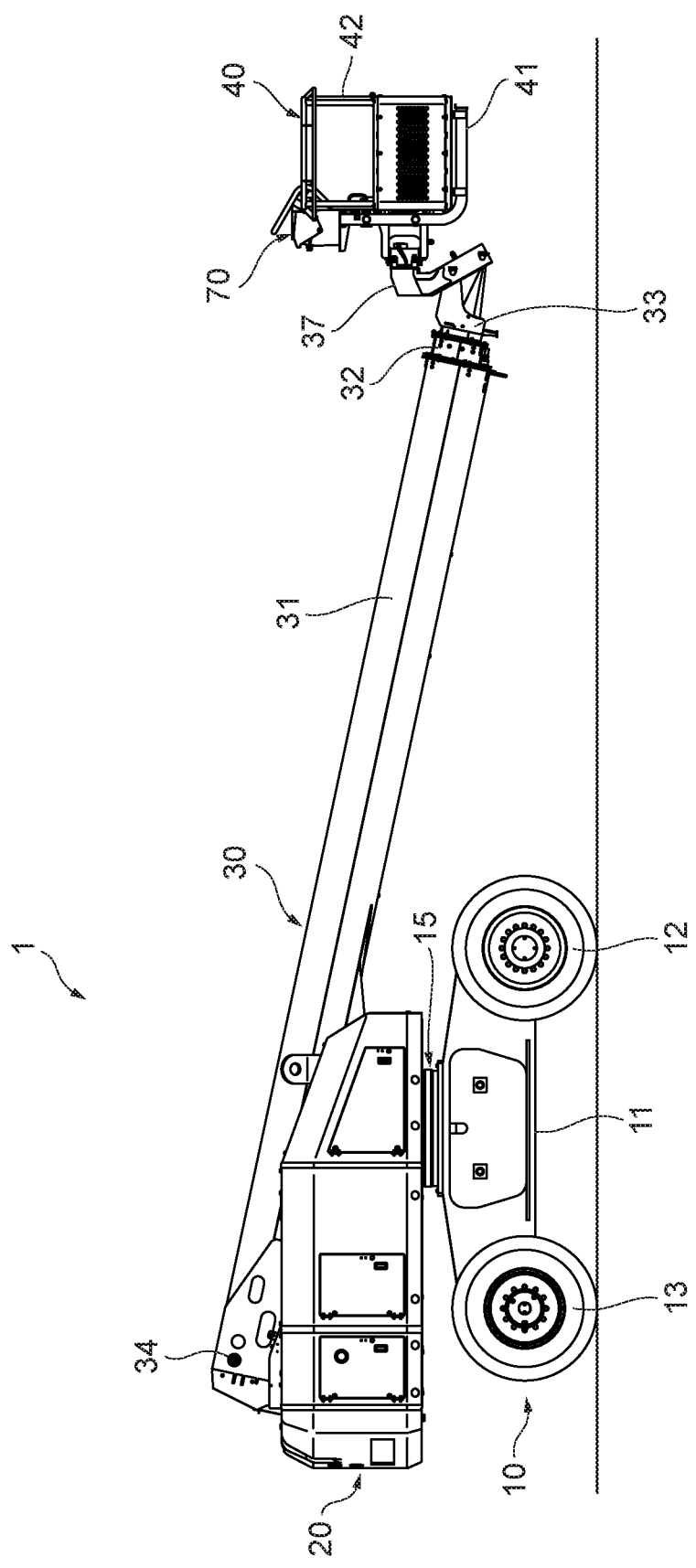
FIG. 1 is a side view of a self-propelled mobile elevating work platform that is an example working vehicle comprising a safety device according to the present invention.
Figure 2:
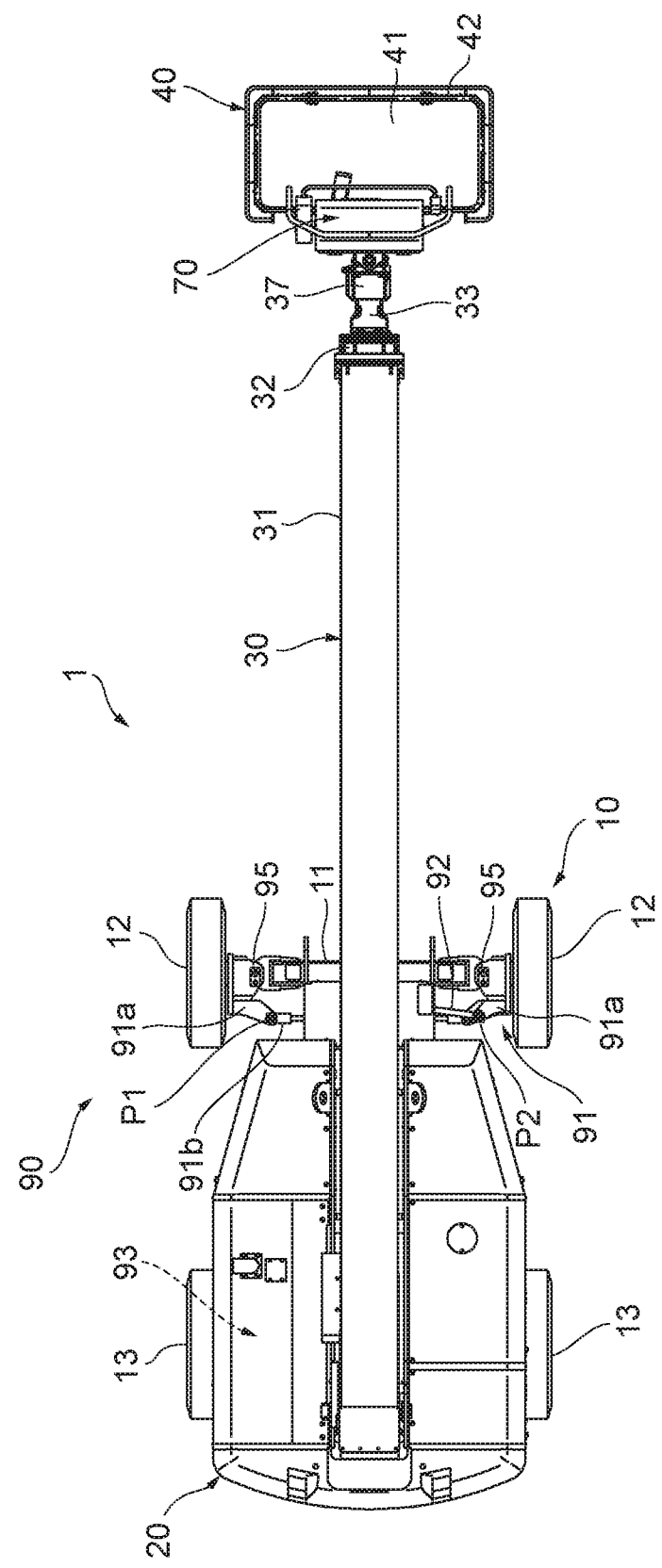
FIG. 2 is a plan view of the mobile elevating work platform.

Embodiments of the present invention will be described below with reference to the drawings. FIGS. 1 and 2 show a self-propelled mobile elevating work platform 1 as an example working vehicle comprising a safety device according to the present invention. The mobile elevating work platform 1 is configured to comprise a traveling body 10 configured to be able to travel, a turning body 20 provided horizontally turnable on the top of the traveling body 10, a boom 30 provided raisable and lowerable on the top of the turning body 20, and a work platform 40 provided at the tip of the boom 30.

The traveling body 10 has a pair of right and left front wheels 12 and a pair of right and left rear wheels 13 rotatably provided on a traveling body frame 11. The front wheels 12 and the rear wheels 13 are tire wheels respectively. The traveling body 10 has two front-wheel traveling motors 16 (see FIG. 3) to rotationally drive the right and left front wheels 12 respectively and two rear-wheel traveling motors 17 (see FIG. 3) to rotationally drive the right and left rear wheels 13 respectively. The traveling body 10 is configured to be able to travel in a desired direction by steering each of the front wheels 12 and rear wheels 13 while rotationally driving the right and left front wheels 12 and rear wheels 13 by the front-wheel and rear-wheel traveling motors 16, 17.

A turning mechanism 15 is provided in the middle of the top of the traveling body frame 11. The turning mechanism 15 has an outer race fixed to the traveling body frame 11, an inner race fixed to the turning body 20 and engaging with the outer race, a turning motor 26 (see FIG. 3) provided in the turning body 20, and a rotary center joint for supplying operating oil from a hydraulic pump P (see FIG. 3) provided in the turning body 20 to the front-wheel and rear-wheel traveling motors 16, 17 and the like provided in the traveling body 10. The turning body 20 is horizontally pivotally provided via the turning mechanism 15 on the traveling body frame 11 and is configured to be turnable in right and left directions with respect to the traveling body 10 by operating the turning motor 26 to rotate normally or reversely.

On the top of the turning body 20, the boom 30 is provided to be vertically swingable (up/down movable) via a pivot joint pin 34. The boom 30 can be raised and lowered with respect to the turning body 20 by a boom raising and lowering cylinder 35 (see FIG. 3) provided across between the turning body 20 and the boom 30. The boom 30 comprises a base boom 31 pivotally coupled to the turning body 20, and an intermediate boom 32 and a top boom 33 combined with the base boom 31 in a nesting structure and is configured to be able to extend and contract. The boom 30 can be extended and contracted by a boom extending and contracting cylinder 36 (see FIG. 3) provided in the boom 30.

A vertical post 37 is provided vertically swingable via a pivot joint pin at the tip of the top boom 33. The work platform 40 is provided turnable in right and left directions (horizontally swingable) at the top of the vertical post 37. An upper-side leveling cylinder (not shown) is provided across between the tip of the top boom 33 and the vertical post 37. This upper-side leveling cylinder forms a closed circuit with a lower-side leveling cylinder (not shown) provided across between the base boom 31 and the turning body 20 via hydraulic hoses and is configured to be extended and contracted according to the extending and contracting of the lower-side leveling cylinder, thereby making the vertical post 37 vertically swing with respect to the top boom 33 so that the floor surface of the work platform 40 is always held horizontal regardless of the rise-fall angle of the boom 30.

The work platform 40 is configured to be able to turn (horizontally swing) in right and left directions with respect to the vertical post 37 by a horizontally swinging motor 46 (see FIG. 3) provided on the work platform 40. The work platform 40 has a substantially rectangular work floor 41 on which a worker can get aboard and a guardrail 42 provided standing around the work floor 41. An operating device 70 with which to operate the traveling body 10 to travel, the boom 30 to work, and so on is provided on the work platform 40.

Figure 3:
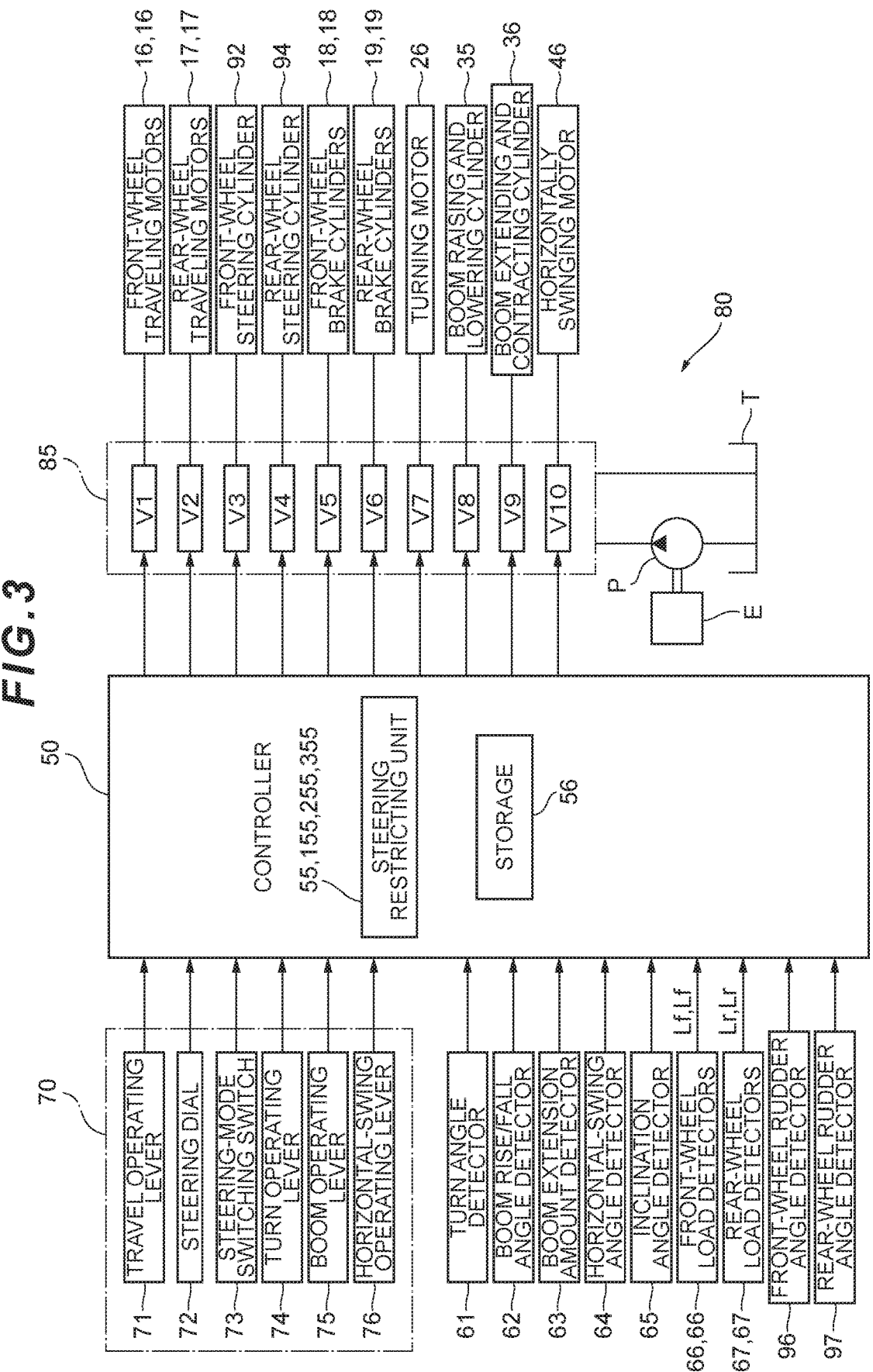
FIG. 3 is a block diagram showing the working control configuration of the mobile elevating work platform.

The operating device 70 has, as shown in FIG. 3, a travel operating lever 71 with which to switch the traveling body 10 between starting to move and stopping and between going forward and going backward and so on, a steering dial 72 with which to steer the traveling body 10 (to steer the front wheels 12 and rear wheels 13), a steering-mode switching switch 73 with which to switch a steering mode of the front wheels 12 and rear wheels 13 (this steering mode will be described later), a turn operating lever 74 with which to operate the turning body 20 to turn, a boom operating lever 75 with which to operate the boom 30 to rise and fall and extend and contract, and a horizontal-swing operating lever 76 with which to operate the work platform 40 to swing horizontally (to turn). Each operating lever of the operating device 70 is configured to be located in a neutral position where it is in a vertical attitude when not being operated and to be able to be inclined in each direction with respect to this neutral position. The mobile elevating work platform 1 is configured such that a worker, being aboard the work platform 40, by operating the travel operating lever 71, steering dial 72, and the like, can make the vehicle travel to a desired work position and, by operating the turn operating lever 74, boom operating lever 75, and the like, can make the work platform 40 move up and down to a desired high position.

The front wheels 12 and rear wheels 13 are connected in coordination with the steering dial 72 via a steering device 90. The steering device 90, as shown in FIGS. 2 and 3, has a front-wheel turning mechanism 91 linked to the right and left front wheels 12, a front-wheel steering cylinder 92 to drive the front-wheel turning mechanism 91 to change the rudder angle of the right and left front wheels 12 (the deflection angle of the front wheels 12 with respect to the front-to-back center axis of the traveling body 10), a rear-wheel turning mechanism 93 linked to the right and left rear wheels 13, a rear-wheel steering cylinder 94 to drive the rear-wheel turning mechanism 93 to change the rudder angle of the right and left rear wheels 13 (the deflection angle of the rear wheels 13 with respect to the front-to-back center axis of the traveling body 10), a front-wheel rudder angle detector 96 to detect the rudder angle of the right and left front wheels 12, and a rear-wheel rudder angle detector 97 to detect the rudder angle of the right and left rear wheels 13.

The front-wheel turning mechanism 91 has a pair of right and left front-wheel knuckle arms 91a to support the right and left front wheels 12 to be swingable around a front-wheel kingpin shaft 95 and a front-wheel tie rod 91b connecting the right and left front-wheel knuckle arms 91a via connection pins P1. The front-wheel steering cylinder 92 is connected at one end to the right front-wheel knuckle arm 91a via a connection pin P2 and at the other end to a cylinder connection portion (not shown) of the traveling body frame 11 via a connection pin. The steering device 90 is configured to make the front-wheel steering cylinder 92 extend and contract, thereby swinging the right front wheel 12 around the front-wheel kingpin shaft 95 and swinging the left front wheel 12 at the same time and in the same direction as the right front wheel 12 via the front-wheel tie rod 91b so as to be able to change the rudder angle of the right and left front wheels 12.

The rear-wheel turning mechanism 93 is configured in the same way as the front-wheel turning mechanism 91. The rear-wheel turning mechanism 93 has a pair of right and left rear-wheel knuckle arms to support the right and left rear wheels 13 to be swingable around a rear-wheel kingpin shaft and a rear-wheel tie rod connecting the right and left rear-wheel knuckle arms via connection pins. The rear-wheel steering cylinder 94 is connected at one end to the right rear-wheel knuckle arm via a connection pin and at the other end to a cylinder connection portion of the traveling body frame 11 via a connection pin. The steering device 90 is configured to make the rear-wheel steering cylinder 94 extend and contract, thereby swinging the right rear wheel 13 around the rear-wheel kingpin shaft and swinging the left rear wheel 13 at the same time and in the same direction as the right rear wheel 13 via the rear-wheel tie rod so as to be able to change the rudder angle of the right and left rear wheels 13.

In the traveling body 10, there are provided two front-wheel brake cylinders 18 to brake the rotation of the right and left front wheels 12 respectively and two rear-wheel brake cylinders 19 to brake the rotation of the right and left rear wheels 13 respectively. The front-wheel brake cylinder 18 is a negative brake (see also FIG. 4) that, when not receiving the supply of operating oil, brakes and locks the rotation of the motor shaft of the front-wheel traveling motor 16 by the force of an incorporated spring so as to brake the rotation of the front wheels 12. In the same way as the front-wheel brake cylinder 18, the rear-wheel brake cylinder 19 is a negative brake that, when not receiving the supply of operating oil, brakes and locks the rotation of the motor shaft of the rear-wheel traveling motor 17 by the force of an incorporated spring so as to brake the rotation of the rear wheels 13.

In the turning body 20, there is provided a hydraulic unit 80 to supply, as a drive source therefor, operating oil to these hydraulic actuators that are the right and left front-wheel traveling motors 16, right and left rear-wheel traveling motors 17, right and left front-wheel brake cylinders 18, right and left rear-wheel brake cylinders 19, front-wheel steering cylinder 92, rear-wheel steering cylinder 94, turning motor 26, boom raising and lowering cylinder 35, boom extending and contracting cylinder 36, horizontally swinging motor 46, and the like. The hydraulic unit 80 comprises an engine E, a hydraulic pump P driven by the engine E, an operating oil tank T, and a control valve unit 85 to control the supply direction and amount of operating oil supplied from the hydraulic pump P to each hydraulic actuator. The control valve unit 85 has a plurality of control valves V1 to V10 provided corresponding to the hydraulic actuators respectively.

A controller 50 to which operation signals are inputted from the operating device 70 provided on the work platform 40 is provided in the turning body 20. When receiving an operation signal from the operating device 70, the controller 50 outputs an instruction signal according to the operation signal to the control valve unit 85 of the hydraulic unit 80. For example, when an operation signal is inputted from the turn operating lever 74 of the operating device 70, the controller 50 outputs an instruction signal according to the inclination operation direction and operation amount of the turn operating lever 74 to the turn control valve V7 of the control valve unit 85 to control the spool movement direction and valve opening degree of the turn control valve V7 so as to make the turning motor 26 drive the turning body 20 to turn with respect to the traveling body 10.

When an operation signal is inputted from the boom operating lever 75, the controller 50 outputs instruction signals according to the inclination operation direction and operation amount of the boom operating lever 75 to the rise/fall and extension/contraction control valves V8, V9 of the control valve unit 85 to control the spool movement directions and valve opening degrees of the rise/fall and extension/contraction control valves V8, V9 so as to make the boom raising and lowering cylinder 35 and the boom extending and contracting cylinder 36 drive the boom 30 to rise/fall and extend/contract. Further, when an operation signal is inputted from the horizontal-swing operating lever 76, the controller 50 outputs an instruction signal according to the inclination operation direction and operation amount of the horizontal-swing operating lever 76 to the horizontal-swing control valve V10 of the control valve unit 85 to control the spool movement direction and valve opening degree of the horizontal-swing control valve V10 so as to make the horizontally swinging motor 46 drive the work platform 40 to swing horizontally with respect to the vertical post 37.

In order to control the working of the turning body 20, the boom 30, and the work platform 40 as above, the mobile elevating work platform 1 comprises a turn angle detector 61 to detect the turn angle of the turning body 20 with respect to the traveling body 10, a boom rise/fall angle detector 62 to detect the rise/fall angle of the boom 30 with respect to the turning body 20, a boom extension amount detector 63 to detect the extension amount of the boom 30, and a horizontal-swing angle detector 64 to detect the horizontal-swing angle (turn angle) of the work platform 40 with respect to the boom 30 (the vertical post 37), and detection signals from these detectors are inputted to the controller 50. The controller 50 always obtains the moving position of the work platform 40 with respect to the traveling body 10 based on the detection signals from these detectors to store.

Figure 4:
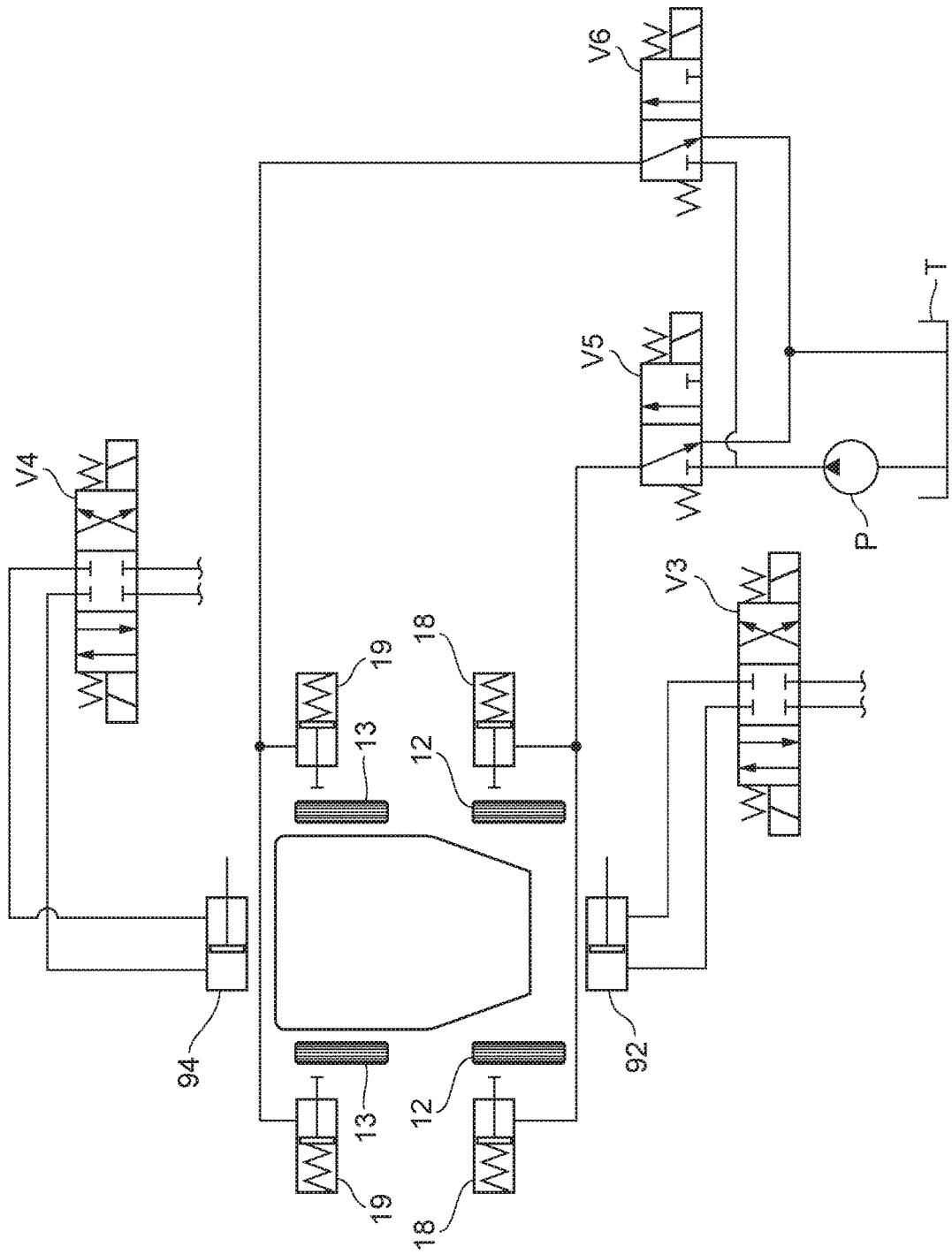
FIG. 4 is a hydraulic circuit diagram showing part of the travel control configuration of the mobile elevating work platform.

Next, the travel control of the mobile elevating work platform 1 (the traveling body 10) will be described using FIGS. 3 and 4. The travel operating lever 71 is configured to be able to be inclined forward and backward from a neutral position where it extends vertically and outputs an operation signal to set the travel direction and target speed of the traveling body 10 according to the inclination operation direction and operation amount from the neutral position to the controller 50. The operation of inclining the travel operating lever 71 forward corresponds to a forward travel signal for the traveling body 10; the operation of inclining backward corresponds to a backward travel signal for the traveling body 10; and the operation of returning to the neutral position corresponds to a stop signal for the traveling body 10. When the operation signal is inputted from the travel operating lever 71, the controller 50 outputs instruction signals according to the operation signal to the front-wheel travel control valve V1, rear-wheel travel control valve V2, front-wheel brake control valve V5, and rear-wheel brake control valve V6 of the travel control valve unit 85 to control the rotational operation of the front-wheel traveling motors 16 and rear-wheel traveling motors 17, that is, the driving of the front wheels 12 and rear wheels 13.

When the travel operating lever 71 is in the neutral position or returned from being inclined to the neutral position, so that the stop signal is inputted, the controller 50 stops the output of instruction signals to the front-wheel travel control valve V1 and the rear-wheel travel control valve V2 so as to stop the supply of operating oil to the front-wheel traveling motors 16 and the rear-wheel traveling motors 17. Further, while the stop signal is being inputted, the output of instruction signals to the front-wheel brake control valve V5 and the rear-wheel brake control valve V6 is stopped in principle except at the time of steering restriction described later. The front-wheel and rear-wheel brake control valves V5, V6 are each a three-port two-position electromagnetic switching valve and, when the output of instruction signals from the controller 50 is stopped so that the solenoid becomes unexcited, cut off the supply of operating oil to the front-wheel brake cylinders 18 and the rear-wheel brake cylinders 19. The right and left, front-wheel and rear-wheel brake cylinders 18, 19 are, as mentioned above, negative brakes and, when the supply of operating oil is stopped, brake and lock the rotation of the motor shafts of the front-wheel traveling motors 16 and rear-wheel traveling motor 17 so as to brake the rotation of the front wheels 12 and the rear wheels 13.

When the travel operating lever 71 is inclined forward or backward from the neutral position so that the forward or backward travel signal is inputted, the controller 50 outputs instruction signals to the front-wheel brake control valve V5 and the rear-wheel brake control valve V6. The front-wheel and rear-wheel brake control valves V5, V6, when their solenoids are excited by the instruction signals from the controller 50, allow operating oil from the hydraulic pump P to be supplied to the front-wheel brake cylinders 18 and the rear-wheel brake cylinders 19 respectively. The right and left, front-wheel and rear-wheel brake cylinders 18, 19, when receiving the supply of operating oil, allow the rotation of the motor shafts of the front-wheel traveling motors 16 and rear-wheel traveling motor 17, that is, the rotation of the front wheels 12 and the rear wheels 13. And the controller 50 outputs instruction signals according to the forward or backward travel signal to the front-wheel travel control valve V1 and the rear-wheel travel control valve V2 to supply operating oil to the front-wheel traveling motors 16 and the rear-wheel traveling motors 17 so as to make the front-wheel traveling motors 16 and the rear-wheel traveling motors 17 rotationally drive in a rotational direction and at a rotational speed according to the forward or backward travel signal for the traveling body 10 to travel forward or backward.

The steering dial 72 is configured to be able to be twisted to the right (clockwise) and to the left (counterclockwise) with respect to a predetermined neutral position and outputs an operation signal to set the target rudder angle for the front wheels 12 and the rear wheels 13 according to the twist operation direction and operation amount from the neutral position to the controller 50. The operation of twisting the steering dial 72 to the right corresponds to a steering signal to change the travel direction of the traveling body 10 to be in the right direction; the operation of twisting to the left corresponds to a steering signal to change the travel direction of the traveling body 10 to be in the left direction; and the operation of returning to the neutral position corresponds to a steering signal to change the travel direction of the traveling body 10 to be in a going straight direction (the rudder angles of the front wheels 12 and the rear wheels 13 being zero).

In the situation where the travel operating lever 71 is inclined so that the forward or backward travel signal is inputted releasing braking by the front-wheel brake cylinders 18 and the rear-wheel brake cylinders 19, when the steering signal is inputted from the steering dial 72, the controller 50 allows the steering device 90 to work and outputs instruction signals according to the steering signal to the front-wheel steering control valve V3 and the rear-wheel steering control valve V4 so as to make the front-wheel steering cylinder 92 and the rear-wheel steering cylinder 94 operate the front wheels 12 and the rear wheels 13 to turn such that the rudder angles detected by the front-wheel and rear-wheel rudder angle detectors 96, 97 coincide with a target rudder angle according to the steering signal.

In contrast, in the situation where the travel operating lever 71 is not inclined so that the stop signal is inputted keeping braking by the front-wheel brake cylinders 18 and the rear-wheel brake cylinders 19, the steering signal being inputted from the steering dial 72 corresponds to so-called "stationary steering", and it is not preferable to release braking without exception or to allow the steering device 90 to work without exception, as mentioned in the technical background and the problems to be solved. Accordingly, the controller 50 has a steering restricting unit 55 to perform appropriate brake control and steering control according to how the road surface being traveled on slopes.

The steering-mode switching switch 73 outputs an operation signal to the controller 50 to select between a small turn mode M1 where while the front wheels 12 are turned in the direction according to the steering signal from the steering dial 72, the rear wheels 13 are turned in the opposite direction to change the travel direction of the traveling body 10, a turn mode M2 where only the front wheels 12 are turned in the direction according to the steering signal (the turning of the rear wheels 13 being restricted) to change the travel direction of the traveling body 10, and a traverse mode M3 where both the front wheels 12 and the rear wheels 13 are turned in the direction according to the steering signal to change the travel direction of the traveling body 10, so as to set the wheels in the selected mode.

An inclination angle detector 65 to detect the inclination angle of the traveling body frame 11 relative to a horizontal surface is provided in the traveling body 10. The inclination angle detector 65 outputs the detected inclination angle of the traveling body 10 as an inclination angle signal to the steering restricting unit 55 of the controller 50.

The steering restricting unit 55 compares the inclination angle $\theta$ of the traveling body 10 detected by the inclination angle detector 65 and a predetermined inclination angle $\theta s$ (e.g., an inclination angle of about $0\pm0.5$ degree) set and stored beforehand in a storage 56 in the controller 50 and determines being on flat land when the inclination angle $\theta$ of the traveling body 10 is less than the predetermined inclination angle $\theta s$ and determines being on sloping land when the inclination angle $\theta$ is greater than or equal to the predetermined inclination angle $\theta s$ to perform brake control and steering control as below.

First, in the situation where the inclination angle θ detected by the inclination angle detector 65 is less than the predetermined inclination angle θs, so that it is determined being on flat land, when the operation of stationary steering is performed (in the situation where the travel operating lever 71 is not inclined, keeping braking by the right and left, front-wheel and rear-wheel brake cylinders 18, 19, when the steering signal is inputted from the steering dial 72), the steering restricting unit 55 outputs instruction signals to the front-wheel brake control valve V5 and the rear-wheel brake control valve V6 to supply operating oil to the front-wheel brake cylinders 18 and the rear-wheel brake cylinders 19 so as to release braking by the right and left, front-wheel and rear-wheel brake cylinders 18, 19. Then the steering restricting unit 55 outputs instruction signals according to the steering signal of the steering dial 72 to the front-wheel steering control valve V3 and the rear-wheel steering control valve V4 so as to make the front-wheel steering cylinder 92 and the rear-wheel steering cylinder 94 operate the front wheels 12 and the rear wheels 13 to turn to take on a target rudder angle according to the steering signal. At this time, if the turn mode M2 where only the front wheels 12 are turned has been selected and set the wheels in by the steering-mode switching switch 73, only the front wheels 12 are turned.

In the situation where the inclination angle θ detected by the inclination angle detector 65 is greater than or equal to the predetermined inclination angle θs, so that it is determined being on sloping land, when the operation of stationary steering is performed, the steering restricting unit 55 does not output instruction signals to the front-wheel brake control valve V5 and the rear-wheel brake control valve V6, thereby making them remain unexcited to keep braking by the front-wheel and rear-wheel brake cylinders 18, 19. Further, the steering restricting unit 55 does not output instruction signals according to the steering signal (related to the operation of stationary steering) of the steering dial 72 to the front-wheel steering control valve V3 and the rear-wheel steering control valve V4, so as to restrict steering working by the front-wheel steering cylinder 92 and the rear-wheel steering cylinder 94 to maintain the rudder angles of the front wheels 12 and the rear wheels 13.

In this situation where steering working is restricted, when the travel operating lever 71 is inclined so that the travel signal is inputted, the steering restricting unit 55 outputs instruction signals to the front-wheel brake control valve V5 and the rear-wheel brake control valve V6 to release braking by the front-wheel and rear-wheel brake cylinders 18, 19 and outputs instruction signals according to the steering signal of the steering dial 72 to the front-wheel steering control valve V3 and the rear-wheel steering control valve V4 so as to make the front-wheel steering cylinder 92 and the rear-wheel steering cylinder 94 operate the front wheels 12 and the rear wheels 13 to turn to take on a target rudder angle according to the steering signal. Further, the steering restricting unit 55 outputs instruction signals according to the travel signal of the travel operating lever 71 to the front-wheel travel control valve V1 and the rear-wheel travel control valve V2 so as to make the front-wheel traveling motors 16 and the rear-wheel traveling motors 17 rotationally drive in a rotational direction and at a rotational speed according to the travel signal for the traveling body 10 to travel.

As such, on flat land of less than the predetermined inclination angle θs, with brakes on four wheels of the front wheels 12 and the rear wheels 13 being released, the turning of the four wheels is allowed, so that none of the stepped operation of steering, an abrupt change in the steering angle at the time of releasing brakes, and so on by accumulating the rebound resilience of tire wheels occurs, and also tires wearing is suppressed. Further, because of flat land of less than the predetermined inclination angle θs, even if brakes on the four wheels are released, there is no danger of runaway such as the mobile elevating work platform 1 traveling down the slope with wheels rolling. Yet further, on sloping land of greater than or equal to the predetermined inclination angle θs, all brake force acting on four wheels of the front wheels 12 and the rear wheels 13 is kept, so that the mobile elevating work platform 1 traveling down the slope with wheels rolling can be reliably prevented.

Next, another embodiment of the safety device according to the present invention will be described. The following embodiment is constructed to have the same configuration as the mobile elevating work platform 1 described in the above embodiment and is different in control form of brake control and steering control of the steering restricting unit 55 in the controller 50.

A steering restricting unit 155 according to a second embodiment compares the inclination angle θ of the traveling body 10 detected by the inclination angle detector 65 and a predetermined inclination angle θs (e.g., an inclination angle of about 0±0.5 degree) set and stored beforehand in the storage 56, and on flat land where the inclination angle θ of the traveling body 10 is less than the predetermined inclination angle θs and on sloping land where the inclination angle θ is greater than or equal to the predetermined inclination angle θs, brake control and steering control are performed as below.

First, on flat land where the inclination angle θ detected by the inclination angle detector 65 is less than the predetermined inclination angle θs, the same brake control and steering control are performed as by the above steering restricting unit 55. In contrast, in the situation where the inclination angle θ detected by the inclination angle detector 65 is greater than or equal to the predetermined inclination angle θs, so that it is determined being on sloping land, when the operation of stationary steering is performed, the steering restricting unit 155 first outputs an instruction signal to the front-wheel brake control valve V5 to release braking by the front-wheel brake cylinders 18. Then the steering restricting unit 155 outputs an instruction signal according to the steering signal of the steering dial 72 to the front-wheel steering control valve V3 so as to make the front-wheel steering cylinder 92 operate the front wheels 12 to turn to take on a target rudder angle according to the steering signal. Then the steering restricting unit 155 stops the output of the instruction signal to the front-wheel brake control valve V5 so as to restore braking by the front-wheel brake cylinders 18.

After braking by the front-wheel brake cylinders 18 is restored, the steering restricting unit 155 outputs an instruction signal to the rear-wheel brake control valve V6 to release braking by the rear-wheel brake cylinders 19. Then the steering restricting unit 155 outputs an instruction signal according to the steering signal of the steering dial 72 to the rear-wheel steering control valve V4 so as to make the rear-wheel steering cylinder 94 operate the rear wheels 13 to turn to take on a target rudder angle according to the steering signal. Then the steering restricting unit 155 stops the output of the instruction signal to the rear-wheel brake control valve V6 so as to restore braking by the rear-wheel brake cylinders 19.

As such, according to the second embodiment, when the operation of stationary steering is performed on sloping land of greater than or equal to the predetermined inclination angle θs, brake control and steering control of the front wheels 12 and the rear wheels 13 are in turn (alternately) performed, so that brake force acting on two wheels of the front wheels 12 or the rear wheels 13 is kept. Thus, the mobile elevating work platform 1 traveling down the slope with wheels rolling can be prevented, and the stepped operation of steering and tires wearing can also be suppressed. Although a configuration where after brake control and steering control of the front wheels 12 are performed, brake control and steering control of the rear wheels 13 are performed is described above, a configuration where after brake control and steering control of the rear wheels 13 are performed, brake control and steering control of the front wheels 12 are performed may be taken on.

A steering restricting unit 255 according to a third embodiment compares the inclination angle θ of the traveling body 10 detected by the inclination angle detector 65 and a predetermined inclination angle θs (e.g., an inclination angle of about 0±0.5 degree) set and stored beforehand in the storage 56, and on flat land where the inclination angle θ of the traveling body 10 is less than the predetermined inclination angle θs and on sloping land where the inclination angle θ is greater than or equal to the predetermined inclination angle θs, brake control and steering control are performed as below.

First, on flat land where the inclination angle θ detected by the inclination angle detector 65 is less than the predetermined inclination angle θs, the same brake control and steering control are performed as by the above steering restricting unit 55. In contrast, in the situation where the inclination angle θ detected by the inclination angle detector 65 is greater than or equal to the predetermined inclination angle θs, so that it is determined being on sloping land, when the operation of stationary steering is performed, the steering restricting unit 255 switches to the turn mode M2 in which only the front wheels 12 are turned and outputs an instruction signal to the front-wheel brake control valve V5 to release braking by the front-wheel brake cylinders 18. Then the steering restricting unit 255 outputs an instruction signal according to the steering signal of the steering dial 72 to the front-wheel steering control valve V3 so as to make the front-wheel steering cylinder 92 operate the front wheels 12 to turn to take on a target rudder angle according to the steering signal. Then the steering restricting unit 255 stops the output of the instruction signal to the front-wheel brake control valve V5 so as to restore braking by the front-wheel brake cylinders 18. Note that the steering restricting unit 255 does not output an instruction signal to the rear-wheel brake control valve V6, so as to keep braking by the rear-wheel brake cylinders 19 and does not output an instruction signal to the rear-wheel steering control valve V4 either, so as to restrict steering working by the rear-wheel steering cylinder 94.

As such, according to the third embodiment, when the operation of stationary steering is performed on sloping land of greater than or equal to the predetermined inclination angle θs, because of switching to the turn mode M2 in which only the front wheels 12 are turned, brake force acting on the rear wheels 13 not turned is kept. Thus, the mobile elevating work platform 1 traveling down the slope with wheels rolling can be prevented, and the stepped operation of steering and tires wearing can also be suppressed.

A steering restricting unit 355 according to a fourth embodiment compares the inclination angle θ of the traveling body 10 detected by the inclination angle detector 65 and a predetermined inclination angle θs (e.g., an inclination angle of about 0±0.5 degree) set and stored beforehand in the storage 56, and on flat land where the inclination angle θ of the traveling body 10 is less than the predetermined inclination angle θs and on sloping land where the inclination angle θ is greater than or equal to the predetermined inclination angle θs, brake control and steering control are performed as below.

In the traveling body 10, there are provided front-wheel load detectors 66 to detect the loads imposed on the right and left front wheels 12 respectively and rear-wheel load detectors 67 to detect the loads imposed on the right and left rear wheels 13 respectively. The front-wheel load detectors 66 and the rear-wheel load detectors 67 output the detected loads imposed on the wheels as load detection signals to the steering restricting unit 355.

First, on flat land where the inclination angle θ detected by the inclination angle detector 65 is less than the predetermined inclination angle θs, the same brake control and steering control are performed as by the above steering restricting unit 55. In contrast, in the situation where the inclination angle θ detected by the inclination angle detector 65 is greater than or equal to the predetermined inclination angle θs, so that it is determined being on sloping land, when the operation of stationary steering is performed, the steering restricting unit 355 compares the loads Lf imposed on the front wheels 12 and detected by the front-wheel load detectors 66 and the loads Lr imposed on the rear wheels 13 and detected by the rear-wheel load detectors 67. Then brake control and steering control are performed on only the side including the wheel whose detected load is the smallest.

For example, if the load imposed on the right front wheel 12 (or the left front wheel 12) is the smallest, the steering restricting unit 355 outputs an instruction signal to the front-wheel brake control valve V5 to release braking by the front-wheel brake cylinders 18. Then the steering restricting unit 355 outputs an instruction signal according to the steering signal of the steering dial 72 to the front-wheel steering control valve V3 so as to make the front-wheel steering cylinder 92 operate the front wheels 12 to turn to take on a target rudder angle according to the steering signal. Then the steering restricting unit 355 stops the output of the instruction signal to the front-wheel brake control valve V5 so as to restore braking by the front-wheel brake cylinders 18. Note that the steering restricting unit 355 does not output an instruction signal to the rear-wheel brake control valve V6, so as to keep braking by the rear-wheel brake cylinders 19 and does not output an instruction signal to the rear-wheel steering control valve V4 either, so as to restrict steering working by the rear-wheel steering cylinder 94.

In contrast, if the load imposed on the right rear wheel 13 (or the left rear wheel 13) is the smallest, the steering restricting unit 355 outputs an instruction signal to the rear-wheel brake control valve V6 to release braking by the rear-wheel brake cylinders 19. Then the steering restricting unit 355 outputs an instruction signal according to the steering signal of the steering dial 72 to the rear-wheel steering control valve V4 so as to make the rear-wheel steering cylinder 94 operate the rear wheels 13 to turn to take on a target rudder angle according to the steering signal. Then the steering restricting unit 355 stops the output of the instruction signal to the rear-wheel brake control valve V6 so as to restore braking by the rear-wheel brake cylinders 19. Note that the steering restricting unit 355 does not output an instruction signal to the front-wheel brake control valve V5, so as to keep braking by the front-wheel brake cylinders 18 and does not output an instruction signal to the front-wheel steering control valve V3 either, so as to restrict steering working by the front-wheel steering cylinder 92.

As such, according to the fourth embodiment, when the operation of stationary steering is performed on sloping land of greater than or equal to the predetermined inclination angle θs, because brake control and steering control are performed on only the two wheels whose loads are smaller, brake force acting on the two wheels whose loads are larger is kept. Thus, the mobile elevating work platform 1 traveling down the slope with wheels rolling can be prevented, and the stepped operation of steering and tires wearing can also be suppressed.

Although embodiments according to the present invention have been described so far, the scope of the present invention is not limited to that shown in the above embodiments. For example, although in the above embodiments the configuration where only the front wheels 12 are turned is described as the turn mode M2, the turn mode M2 may take on a configuration where only the rear wheels 13 are turned. Further, although the above embodiments have the four-wheel drive configuration having the front-wheel traveling motors 16 and the rear-wheel traveling motors 17, a two-wheel drive configuration where either of the front wheels 12 and the rear wheels 13 are driven may be taken on. Yet further, although the configuration comprising the steering dial 72 as steering operation device is described in the above embodiments, a configuration comprising a steering operation lever whose output changes according to the inclination angle may be taken on.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A safety device of a working vehicle comprising:
   front wheels and rear wheels rotatably provided on the front and rear, and right and left of a vehicle body respectively;
   a steering device to make each of the front wheels and the rear wheels turn to change a travel direction of the vehicle;
   a drive device to rotationally drive at least either of the front wheels and the rear wheels to make the vehicle travel;
   a brake device to brake the rotation of the front wheels and the rear wheels;
   a steering operation device being operated by an operator to steer the front wheels and the rear wheels;
   a travel operation device being operated by an operator to make the vehicle travel by the drive device; and
   a controller to control working of the steering device based on a steering operation of the steering operation device and to control working of the drive device and the brake device based on a travel operation of the travel operation device,
   wherein when any travel operation by the travel operation device is not performed, the controller performs braking the front wheels and the rear wheels by the brake device, and
   wherein when a travel operation by the travel operation device is performed, the controller releases the braking by the brake device and makes the drive device work the vehicle to travel based on the travel operation,
   the safety device comprising:
   a vehicle body inclination angle detecting circuit to detect an inclination angle of the vehicle body relative to a horizontal surface,
   wherein in a vehicle body attitude in which the inclination angle of the vehicle body detected by the vehicle body inclination angle detecting circuit is less than a predetermined inclination angle, while any travel operation by the travel operation device is not performed, when a steering operation by the steering operation device is performed, the controller performs control to release braking the front wheels and the rear wheels by the brake device and to make the steering device turn the front wheels and the rear wheels in accordance with the steering operation.

2. The safety device of the working vehicle according to claim 1, wherein in a vehicle body attitude in which the inclination angle of the vehicle body is greater than or equal to the predetermined inclination angle, while any travel operation by the travel operation device is not performed, when a steering operation by the steering operation device is performed, the controller keeps braking the front wheels and the rear wheels by the brake device and restricts steering by the steering device so as not to turn both the front wheels and the rear wheels, and
   wherein while the restriction is being performed, when a travel operation by the travel operation device is performed, the controller performs control to release braking the front wheels and the rear wheels by the brake device and to make the steering device turn the front wheels and the rear wheels in accordance with the steering operation and to make the drive device work the vehicle to travel in accordance with the travel operation.

3. The safety device of the working vehicle according to claim 1, wherein in a vehicle body attitude in which the inclination angle of the vehicle body is greater than or equal to the predetermined inclination angle, while any travel operation by the travel operation device is not performed, when a steering operation by the steering operation device is performed, the controller performs control to release braking either wheels of the front wheels and the rear wheels by the brake device and to make the steering device turn the either wheels and thereafter to release braking the other wheels of the front wheels and the rear wheels by the brake device and to make the steering device turn the other wheels.

4. The safety device of the working vehicle according to claim 1, wherein the steering device is configured to be switchable between a four-wheel turning state where each of the front wheels and the rear wheels is turned and a two-wheel turning state where only either wheels of the front wheels and the rear wheels are turned, and
   wherein in a vehicle body attitude in which the inclination angle of the vehicle body is greater than or equal to the predetermined inclination angle, while travel operation by the travel operation device is not performed, when steering operation by the steering operation device is performed, the controller performs control to switch the steering device to the two-wheel turning state and to release braking the either wheels by the brake device and to make the steering device turn the either wheels.

5. The safety device of the working vehicle according to claim 1, comprising:
   a wheel load detecting device to detect a load imposed on each of the front wheels and the rear wheels,
   wherein in a vehicle body attitude in which the inclination angle of the vehicle body is greater than or equal to the predetermined inclination angle, while any travel operation by the travel operation device is not performed, when a steering operation by the steering operation device is performed, the controller performs control to release braking by the brake device for only the wheels whose loads detected by the wheel load detecting device are smaller from among the front wheels and the rear wheels and to make the steering device turn only the wheels.

* * * * *